(12) United States Patent
Ichikawa et al.

(10) Patent No.: US 7,521,491 B2
(45) Date of Patent: *Apr. 21, 2009

(54) OIL-BASED INK COMPOSITION FOR BALLPOINT PEN AND BALL-POINT PEN USING OIL-BASED INK

(75) Inventors: Shuji Ichikawa, Yokohama (JP); Miyuki Shoji, Tokyo (JP)

(73) Assignee: Mitsubishi Pencil Co., Ltd., Tokyo (JP)

(*) Notice: Subject to any disclaimer, the term of this patent is extended or adjusted under 35 U.S.C. 154(b) by 571 days.

This patent is subject to a terminal disclaimer.

(21) Appl. No.: 10/528,405

(22) PCT Filed: Sep. 19, 2003

(86) PCT No.: PCT/JP03/12034

§ 371 (c)(1),
(2), (4) Date: May 17, 2005

(87) PCT Pub. No.: WO2004/026980

PCT Pub. Date: Apr. 1, 2004

(65) Prior Publication Data

US 2005/0228070 A1    Oct. 13, 2005

(30) Foreign Application Priority Data

Sep. 20, 2002  (JP) ............................. 2002-275807
Sep. 20, 2002  (JP) ............................. 2002-275816

(51) Int. Cl.
*C09D 11/00* (2006.01)
(52) U.S. Cl. .................................... 523/160; 523/161
(58) Field of Classification Search ................. 523/160, 523/161
See application file for complete search history.

(56) References Cited

U.S. PATENT DOCUMENTS 5,980,624 A    11/1999  Ichikawa
6,398,441 B1 *  6/2002  Takayanagi ................. 401/192
6,562,116 B1 *  5/2003  Satoh ....................... 106/31.58
7,381,754 B2 *  6/2008  Ichikawa et al. ............. 523/160

FOREIGN PATENT DOCUMENTS

| EP | 1 277 812 A1 | 1/2003 |
|---|---|---|
| JP | 2001-152069 A | 6/2001 |
| JP | 2001-207102 A | 7/2001 |
| JP | 2002-12806 A | 1/2002 |
| JP | 2002-97401 A | 4/2002 |
| JP | 2002-201398 A | 7/2002 |
| JP | 2004-107594 A | 4/2004 |
| WO | WO 01/74956 A1 | 10/2001 |

* cited by examiner

*Primary Examiner*—Edward J Cain
(74) *Attorney, Agent, or Firm*—Foley & Lardner LLP (57) ABSTRACT

An oil-based ink composition for a ball-point pen that enables suppression of a blobbing phenomenon by controlling the internal cohesion force of an ink is provided; An oil-based ink composition for a ball-point pen at least comprising a colorant, a resin, and from 0.01 to 1.5 % by weight of a high polymerization degree polybutyl vinylal with a polymerization degree of 900 (theoretical molecular weight of 60,000) or more and comprising, as a main solvent, a solvent selected from alcohols, polyhydric alcohols, and glycol ethers with a vapor pressure at 25° C. of 0.001 mmHg or higher by 50% or more for the entire solvent. Further, an oil-based ink composition for use in a ball-point pen having a smooth feel in writing, and excellent in the improvement for the fastness and the dispersion stability of the coloring pigment is provided; an oil-based ink composition for use in a ball-point pen containing, as a main solvent, a solvent of the chemical structural formula (1)

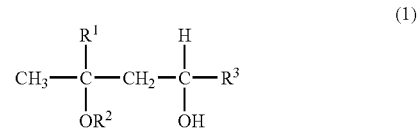

(1)

where $R^1$, $R^2$, and $R^3$ each represents independently H or $CH_3$.

12 Claims, 1 Drawing Sheet

Fig.1

OIL-BASED INK COMPOSITION FOR BALLPOINT PEN AND BALL-POINT PEN USING OIL-BASED INK

This application is a National Stage application of PCT/JP2003/012034, filed Sep. 19, 2003, which claims priority from Japanese patent applications 2002-275807 and 2002-275816, both filed Sep. 20, 2002. The entire contents of each of the aforementioned applications are incorporated herein by reference.

TECHNICAL FIELD OF THE INVENTION

The present invention relates to an oil-based ink composition for a ball-point pen and an oil-based ball-point pen. More specifically, it relates to an oil-based ink composition for a ball-point pen having soft and smooth feel on writing and rapid penetration of the ink to a writing paper surface, and able to suppress point seepage (deposition blobbing) of the ink at a pen tip during writing and an accompanying dripping of the ink onto the paper surface (drawn line blobbing) as much as possible. It also relates to an oil-based ink composition for a ball-point pen having a smooth feel on writing, and excellent in an improvement of fastness, a coloring property and the dispersion stability of a pigment. It further relates to an oil-based ball-point pen using the oil-based ink composition and having a back-flow-preventive mechanism mounted therein.

BACKGROUND ART

Heretofore, in oil-based ball-point pens, for suppressing a so-called sagging phenomenon in which an ink leaks from the top end of a tip, point seepage at the tip or blobbing phenomenon of contaminating the paper surface due to a simple structure thereof, problems were solved by the approach of controlling the viscosity of the ink to about 10,000 mPa·s, restricting the ink discharge mechanism in view of the structural design such as the inner diameter of a ink containing tube, clearance at the pen tip, etc., adding inorganic filler particles to the ink thereby providing thixotropy, or adding a certain polymer to give an effect on the ink discharge. However, as mixed solvents comprising components such as less volatiling aromatic type glycol ether and aromatic type alcohol are usually used for the ink solvent, no remarkable progress has been made other than the procedures described above.

In view of the above, an object in the first aspect of the invention is to provide an ink composition for a ball-point pen that enables suppression of the blobbing phenomenon by controlling the volatility of the ink solvent to prevent excessive drying on the ball surface and suppressing the blobbing phenomenon by controlling the internal cohesion force of the ink.

Further, in the commercially available oil-based ball-point pens described above, the solvent comprises a mixture of 2-phenoxy ethanol and benzyl alcohol, and an oil-based ball-point pen using, as the main solvent, a solvent represented by the chemical structural formula (1):

(1)

where $R^1$, $R^2$, and $R^3$ each represents independently H or $CH_3$ has not yet been commercially available.

While seeking a smooth writing feel, rapid ink penetration to the writing surface, a good drying property at the pen tip, etc., the present inventor has studied ink compositions using, as a main solvent, a solvent of chemical structural formula (1) (refer to Japanese Patent Application No. Hei 12-232004 which was not laid-open at the time of filing Japanese Patent Application No. 2002-275807 as the basis for claiming the priority of the present application).

Further, in the conventional oil-based ball-point pens, as it is difficult to use a pigment in the oil-based ball-point pen, light fastness was usually ensured by using, for example, a metal-containing dye in order to enhance the light fastness. However, a pigment is excellent in view of the fastness.

Further, in the conventional oil-based ball-point pens, as a high viscosity ink is used, it has not been adopted, to provide back-flowing structure, an ink follower for preventing back flow, or providing a back-flow-preventive mechanism at a joint portion connecting a tip and an ink containing tube in order to prevent back flow.

The present inventor had reached that idea that, in the oil-based ball-point pen using the ink composition using the solvent of the chemical structural formula (1) as a main solvent, the flowability of the solvent is high and air tends to intrude from the pen tip and cause disadvantages it is necessary to mount a back-flow-preventive mechanism. Further, with the intention of using a pigment for light fastness, the inventor has made a study to provide an oil-based ink composition favorable in the fastness, coloring property and dispersion stability of the pigment, in an oil-based ball-point pen that holds an ink composition using the solvent of the chemical structural formula (1) as a main solvent, and a back-flow-preventive mechanism.

In the second aspect, the invention is intended to provide an oil-based ink composition for use in a ball-point pen having smooth feel of writing, and excellent in the improvement of the fastness, the coloring property and the dispersion stability of the pigment and having a back-flow-preventive mechanism therein, different from the conventional method, and an oil-based ball-point pen having a back-flow-preventive mechanism and using the oil-based ink composition described above.

DISCLOSURE OF THE INVENTION

To attain the objects described above, it has been found that the oil-based ink composition for a ball-point pen according to the invention can solve the problems by the features shown below and the invention has been accomplished.

[1] An oil-based ink composition for a ball-point pen comprising at least a colorant and a resin, as well as a solvent selected from alcohols, polyhydric alcohols and glycol ethers each having a vapor pressure at 25° C. of 0.001 mmHg or higher as a main solvent occupying 50% or more of the entire solvent, and satisfying at least one of the following (a) and (b):

(a) comprising from 0.01 to 1.5% by weight of a high polymerization degree polyvinyl butyral with a polymerization degree of 900 (theoretical molecular weight of 60,000) or more, and (b) comprising a pigment as the colorant and polyvinyl butyral as a dispersant, said main solvent being a solvent represented by the following chemical structural formula (1):

where $R^1$, $R^2$, and $R^3$ each represents independently H or $CH_3$.

[2] The oil-based ink composition for a ball-point pen according to [1] described above, wherein, in a case of (a) described above, the glycol ether is represented by the following chemical structural formula (1):

where $R^1$, $R^2$, and $R^3$ each represents independently H or $CH_3$,

[3] The oil-based ink composition for a ball-point pen according to [1] or [2] described above, wherein the colorant is a pigment or a pigment and a dye used in combination.

[4] The oil-based ink composition for a ball-point pen according to any one of [1] to [3] described above, wherein, in the case of (a) described above, polyvinyl butyral with a polymerization degree of 900 (theoretical molecular weight of 60,000) or less is further used as a pigment dispersant.

[5] The oil-based ink composition for a ball-point pen according to [4] described above, wherein polyvinyl butyral with a polymerization degree of 200 or more and 500 or less (theoretical molecular weight of from 10,000 to 30,000) is used as said pigment dispersant.

[6] The oil-based ink composition for use in a ball-point pen according to any one of [1] to [5] described above, wherein a neutralization product of a phosphate ester is contained as an additive.

[7] The oil-based ink composition for use in a ball-point pen according to [1] above, wherein in the case of (b) described above, the polyvinyl butyral has an average molecular weight of from 10,000 to 30,000.

[8] The oil-based ink composition for use in a ball-point pen according to [1] or [7] described above, which has an ink viscosity at 25° C. of from 500 to 3,000 mPa·s.

[9] The oil-based ball-point pen comprising said oil-based ink composition for a ball-point pen as set forth in any one of [1] to [8], and a back-flow-preventive mechanism provided to a joint portion connecting a tip and an ink containing tube.

[10] The oil-based ball-point pen according to [9] described above, wherein an ink follower is further provided to an ink rear end portion of an ink containing tube to prevent ink evaporation and back flow.

DESCRIPTION OF PREFERRED
EMBODIMENTS OF THE INVENTION

<First Aspect of the Invention (Condition (a))>

As the main solvent (50% by weight or more of the entire solvent) used for the composition of the invention, a solvent selected from alcohols, polyhydric alcohols, and glycol ethers with a vapor pressure at 25° C. of 0.001 mmHg or higher is used. The specified solvent with high vapor pressure as described above gives a smooth writing feel and rapid ink penetration to the writing surface. The ink-based ink composition for a ball-point pen of the invention has been developed with an aim of solving the problem inherent to the case of using a specific solvent with such a high vapor pressure. The main solvent means that it is 50% by weight or more of the entire solvent and it can, optionally, be 70% by weight or more, further, 80% by weight or more, and, particularly, 90% by weight or more.

Specifically, alcohols are aliphatic alcohols with 2 or more of carbon atoms and include, for example, ethanol, n-propanol, isopropanol, n-butanol, isobutanol, tert-butyl alcohol, 1-pentanol, isoamyl alcohol, sec-amyl alcohol, 3-pentanol, tert-amyl alcohol, n-hexanol, methylamyl alcohol, 2-ethyl butanol, n-heptanol, 2-heptanol, 3-heptanol, n-octanol, 2-octanol, 2-ethylhexanol, 3,5,5-trimethyl hexanol, nonanol, n-decanol, undecanol, n-decanol, trimethylnonyl alcohol, tetradecanol, heptadecanol, cyclohexanol, 2-methylcyclohexanol, benzyl alcohol and various other higher alcohols.

Further, the polyhydric alcohols include those polyhydric alcohols having two or more carbon atoms and two or more hydroxy groups in the molecule such as ethylene glycol, diethylene glycol, 3-methyl-1,3-butanediol, triethylene glycol, dipropylene glycol, 1,3-propane glycol, 1,3-butanediol, 1,5-pentanediol, hexylene glycol, and octylene glycol.

The glycol ethers include, for example, methyl isopropyl ether, ethyl ether, ethyl propyl ether, ethyl butyl ether, isopropyl ether, butyl ether, hexyl ether, 2-ethylhexyl ether, ethylene glycol monohexyl ether, ethylene glycol monophenyl ether, ethylene glycol mono-2-ethyl butyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monobutyl ether, 3-methyl-3-methoxy-1-butanol, 3-methoxy-1-butanol, propylene glycol monomethyl ether, propylene glycol monoethyl ether, propylene glycol monopropyl ether, propylene glycol monobutyl ether, propylene glycol phenyl ether, propylene glycol tertiary butyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monobutyl ether, and tetrapropylene glycol monobutyl ether.

Particularly preferred are those solvents represented by the chemical structural formula (1) and include, for example, 1,3-butane diol, 3-methoxy-1-butanol, and 3-methyl-3-methoxy-1-butanol.

Among the solvents described above, particularly preferred are glycol ethers of 2 to 7 carbon atoms the effect of which is, particularly, recognizable easily. Further, with the view point of safety, oral toxicity, etc., organic solvents other than ethylene glycol derivatives, etc. are preferably used.

Further, in addition to the solvents described above, the solvents shown below can also be added. In this case, other solvents are preferably added, in a case of adding a mixture of a phosphate ester and an amine type compound to be described later, within such a range as not hindering the solubility therewith, and the evaporation function.

Examples of them are polyhydric alcohol derivatives and also include sorbitan fatty acid type, polyglycerine higher fatty acid type, sucrose fatty acid type and propylene glycol fatty acid type derivatives.

The ester solvents include, for example, various esters such as propylene glycol methyl ether acetate, propylene glycol diacetate, 3-methyl-3-methoxybutyl acetate, propylene glycol ethyl ether acetate, ethylene glycol ethyl ether acetate, butyl formate, isobutyl formate, isoamyl formate, propyl acetate, butyl acetate, isopropyl acetate, isobutyl acetate, isoamyl acetate, methyl propionate, ethyl propionate, propyl propionate, isobutyl propionate, isoamyl propionate, methyl butyrate, ethyl butyrate, propyl butyrate, methyl isobutyrate, ethyl isobutyrate, propyl isobutyrate, methyl valerate, ethyl valerate, propyl valerate, methyl isovalerate, ethyl isovalerate, propyl isovalerate, methyl trimethyl acetate, ethyl trimethyl acetate, propyl trimethyl acetate, methyl caproate, ethyl caproate, propyl caproate, methyl caprylate, ethyl caprylate, propyl caprylate, methyl laurate, ethyl laurate, methyl oleate, ethyl oleate, triglyceride caprylate, tributyl acetate citrate, octyl oxystearate, propylene glycol monolicinorate, methyl 2-hydroxy isobutyrate, 3-methoxybutyl acetate.

Further, diether or diester solvents not having hydroxyl groups in the molecule specifically include, for example, ethylene glycol diethyl ether, ethylene glycol dibutyl ether, diethylene glycol diethyl ether, diethylene glycol dibutyl ether, diethylene glycol dimethyl ether, and dipropylene glycol dimethyl ether.

The colorant used in the oil-based ink for a ball-point pen of the present invention is preferably used, although not restricted, in the form of a pigment or a pigment and a dye used in combination. Use of the pigment can provide excellent fastness. As the pigment, carbon black, and organic pigments such as phthalocyanine type, azo type including insoluble azo type such as monoazo, disazo, condensed azo and chelate azo type and soluble azo type such as less soluble azo type and soluble azo type, quinacridone type, diketopyrrolopyrrole type, threne type, dioxadine type and isoindolinone type can be used.

Particularly, for the carbon black, those with a specific surface area as small as possible should be used. Those having a value of 100 m$^2$/g or less as measured by the BET method are preferred. Specifically, they include carbon black manufactured by Mitsubishi Kasei such as #33, #32, #30, #25, and CF9, carbon black manufactured by Cabot Co. such as REGAL (400R, 500R, 330R, 300R), ELFTEX (8, 12), and STERLING R, carbon black manufactured by Degussa Co. such as Printex (45, 40, 300, 30, 3, 35, 25, 200, A, G), and SB (250, 200) and carbon black manufactured by Colombian Co. such as RAVEN (1040, 1035, 1020, 1000, 890, 890H, 850, 500, 450, 420, 410, H20, 22, 16, 14).

Further, as the pigment, those less soluble in the organic solvent used and having an average grain size after dispersion of 30 nm to 700 nm are preferred. For the blending amount of the pigment, they can be blended optionally, within a range from 0.5 to 25% by weight and, preferably, from 0.5 to 20% by weight based on the entire amount of the ink composition.

The pigments usable herein can be used alone or as a mixture of two or more of them. Further, also, a dispersion using an inorganic pigment, dye, etc. can also be added optionally within such an extent as not giving undesired effects on the dispersion stability. Use of the dye can provide excellent coloring property. Further, they also include resin emulsions obtained by polymerizing styrene, acrylic acid, acrylate ester, methacrylic acid, methacrylate ester, acrylonitrile and olefinic monomer, hollow resin emulsions which swell in the ink into the indefinite form, or organic multi-color pigments comprising dyed resin particles obtained by dying the emulsion per se with a colorant.

In a case where the coloring material used in the invention is a pigment, various methods known so far can be used for preparing a pigment-dispersed ink composition. For example, it can be obtained easily by blending each of the ingredients, and then stirring under mixing by a stirrer such as a dissolver, or by mixing and pulverizing by a ball mill, roll mill, beads mill, sand mill, pin mill, etc. and then removing coarse particles, undissolved matters and intruded solid matters of the pigments by centrifugal separation or filtration.

As the dyes used in combination with the pigment described above, any of them can be used with no particular restriction so long as it does not destroy the dispersion system. For the dyes, any of direct dyes, acidic dyes, basic dyes, mordant dyes, acidic mordant dyes, spirit soluble dyes, azoic dyes, sulfide/sulfide vat dyes, vat dyes, dispersion dyes, oil soluble dyes, food dyes, metal complex salt dyes, which are used for usual dye ink compositions or organic and inorganic dyes which are used for usual pigment ink compositions can be used. The blending amount is selected within a range from 1 to 50% by weight based on the entire amount of the composition.

Resins are used for the oil-based ink composition for a ball-point pen of the present invention. The resins are used in the oil-based ink composition for controlling the viscosity or improving the abrasion property at the pen tip. Further, in a case of using the pigment, it is used also as a dispersant therefor. Such resins include those resins typically represented, for example, by ketone resin, styrene resin, styrene-acryl resin, terpene phenol resin, rosin modified maleic acid resin, rosin phenol resin, alkyl phenol resin, phenolic resin, styrene-maleic acid resin, rosin type resin, acrylic resin, urea aldehydel type resin, maleic acid type resin, cyclohexanone type resin, polyvinyl butyral, and polyvinyl pyrrolidone.

The blending amount of the resin is, preferably, from 1 to 30% by weight and, more preferably, from 1 to 20% by weight. In a case where the blending amount is less than 1% by weight, this makes it difficult for the control of the viscosity and abrasion at the pen tip. In a case where it exceeds 30% by weight, raw materials other than the resin cannot be blended or it gives an undesired effect on the feel of writing.

In a case of using the pigment as the coloring material for the ink composition of the invention, as the dispersants to be used, those capable of dispersing the pigments can be selected from the resins described above and used, and it may be an activating agent or an oligomer, irrespective of the type thereof so long as it can suffice the purpose. Specific dispersant can include, for example, polyvinyl alcohol, polyvinyl pyrrolidone, polyvinyl butyral, polyvinyl ether, styrene-maleic acid copolymer, ketone resin, hydroxy ethylcellulose or derivatives thereof, synthetic resins, such as styrene-acrylic acid copolymer, PO/EO (propyrene oxide/ethylene oxide) adducts, and amine type oligomers of polyesters. However, polyvinyl butyral is particularly used suitably herein and polyvinyl butyral of a theoretical molecular weight particularly of from 10,000 to 30,000 with a polymerization degree of 200 or more and 500 or less can be used suitably. The addition amount is different depending on the characteristics and the addition amount of the pigment that is used within a range from 0.01 to 10% by weight.

Further, in the oil-based ink composition for a ball-point pen of the present invention, a high polymerization degree polyvinyl butyral with a polymerization degree of 900 (theoretical molecular amount: 60,000) or more is essentially used. This is a raw material for controlling the internal cohesion force of the ink and the addition thereof has an effect of withdrawing or collecting blobbing that occurs due to excessive ink during transfer by the internal cohesion force also to an ink of low viscosity at 500 to 3,000 mPa·s containing the colorant and the resin. The polymerization degree of the high polymerization degree polyvinyl butyral that provides such effect is 900 or more and the effect is not shown at all in a case where it is less than the degree described above. The polymerization degree is, preferably, 1300 or more and, more preferably, 1500 or more. Further, it is also possible to use those with different polymerization degrees in combination. In the ink composition of the present invention, the addition amount of the high polymerization degree polyvinyl butyral should be an extremely small amount as 0.01 to 1.5% by weight based on the ink composition. The effect of withdrawing or collecting the excessive ink relative to the blobbing phenomenon described above is not provided in a case where the addition amount is less than 0.01% by weight. On the other hand, when it is higher than 1.5% by weight, the viscosity increases excessively to give undesired effects on the raw materials. Since formation of the internal cohesion force varies depending on the solvent used, the degree for the reduction of the blobbing phenomenon may sometimes be changed by the selection of an auxiliary solvent depending on the main solvent by controlling the dissolved state thereof.

The polyvinyl butyral used in this aspect in the present invention includes, for example, S-LEC B series manufactured by Sekisui Chemical Co. or Denka butyral series manufactured by Denka Co., and includes, specifically, BH-3, BH-6, BH-A, BH-S, BX-1, BX-3, and BX-5.

Further, in the ink composition of the present invention, a phosphate ester is used to easily remove dried ink coagulates at the periphery of a ball. Particularly, while dried ink coagulates tend to be formed to the periphery of the ball due to the resin, the coloring material and other ingredients, addition of the phosphate ester provides an effect of making the dried ink coagulates easily removable. Further, the high polymerization degree polybutyl vinylal has an effect of making the ball surface less wetted by the internal cohesion force thereof and it cooperates with the phosphate ester.

The phosphate ester usually comprises a monoester, diester, and a minute amount of triester of phosphoric acid and the ester structure thereof is mainly a surfactant type including two types of aromatic and aliphatic types. For the alkyl group capable of forming the phosphate ester, alkyl groups obtained from natural and synthetic higher alcohols, etc. are introduced. A phosphate ester having an alkyl group of 10 to 20 carbon atoms and 0 to 50 polyoxyethylene chains are used. Particularly, a phosphate ester having an alkyl group of 15 to 20 carbon atoms and from 0 to 4 polyoxyethylene chains is preferred.

For neutralizing the phosphate ester, it is preferably used as a mixture with an amine type material. As the amine type material for neutralization, it is preferred to neutralize it with an amine type compound such as an alakanol amine, polyoxyethylene alkylamine, amphoteric surfactant and aliphatic amine type material.

For the addition amount of the phosphate ester and the amine type compound, they are preferably added as a mixture by the neutralization in an amount from 0.01% by weight to 15% by weight of the ink composition and, more preferably, it is from 0.1 to 10% by weight. Further, it is, particularly, preferably from 0.1 to 8% by weight. In a case where it is less than 0.01 by weight, ink coagulates on the surface of the ball and cannot be removed easily. Further, if it is blended in excess of 15% by weight, it tends to cause disadvantages such as being repelled excessively from the ball tending to cause breakage of drawn lines in view of the drawing quality.

Further, in the present invention, an anti-rust agent, an anti-mold agent, a surfactant, a lubricant and a wetting agent, etc. capable of compatibilization with ink without giving undesired effects thereon can be blended optionally. Particularly, a fatty acid or the like can be used suitably as the lubricant. Further, a non-volatile solvent, etc. compatible with the main solvent can also be blended, as the drying suppression additive, to within a range not giving undesired effects in view of the properties of the products.

In a case of using the ink composition of the present invention to a ball-point pen, it is preferred to provide an ink follower to the rear end of the ball-point pen. As the solvent used is volatile, the ink follower is added for preventing evaporation, preventing moisture absorption and preventing ink leakage.

It is necessary for the ink follower to be less permeable and less diffusible to the solvent used for the ink, and non-volatile or less-volatile fluid, specifically, non-silicone type oils and fats not basically having compatibility with the solvent described in the claims such as polybutene or liquid paraffin can be used as the base therefor. In a case where the viscosity of the material is low, a viscosity improver or gelling agent is preferably used. Specifically, it includes metal soaps, bentonites, fatty acid amides, hydrogenated castor oils, fine metal particles containing titanium oxide, silica or alumina or celluloses and elastomers.

The reason for providing such effects resides in the feature of the ink composition and the blobbing phenomenon is not developed as in the usual case by controlling the viscosity of the ink to about 10,000 mPa·s, restricting the ink discharge mechanism by the structural design such as for the inner diameter of the ink containing tube or the clearance at the pen tip, providing thixotropy by the addition of inorganic filler particles to the ink, or by the addition of a high molecular weight polyvinyl pyrrolidone. Particularly, a high molecular weight polyvinyl pyrrolidone cannot be used because the addition of the high molecular weight polyvinyl pyrrolidone to the highly hygroscopic main solvent causes violent moisture absorption under high temperature and high humidity to remarkably increase the water content in the ink and the viscosity also lowers. As a result, sagging of an ink from the top end of the tip induces dripping of stagnated ink to a writing line, which deteriorates the quality of the drawn line. Further, as the water content continues to increase, deposition of raw materials in the ink also occurs to result in increase of a disadvantage to the performance. As the polymer which does not cause moisture absorption as of by polyvinyl pyrrolidone and enhances the internal cohesive force, a high polymerization degree polyvinyl butyral is used herein. Particularly, those with a low degree of butylation in the molecule and having larger amount of hydroxyl group and higher polymerization degree tend to increase the effect of suppressing the blobbing phenomenon. From the foregoing, it is possible to provide an oil-based ink composition for use in a ball-point pen which restricts the development of the blobbing phenomenon remarkably by the use of the high polymerization degree polyvinyl butyral.

<Second Aspect of the Invention (Condition (b))>

The main solvent in the solvent used for the oil-based ink composition for a ball-point pen in this aspect of the present invention is a solvent represented by the chemical structural formula (1):

where $R^1$, $R^2$, $R^3$ each independently represents H or $CH_3$, and it includes, specifically, 1,3-butanediol, 3-methoxy-1- butanol, 3-methyl-3-methoxy-1-butanol, etc. By the use of the solvent described above, it is possible to provide a smooth writing feel. The main solvent means 50% by weight or more based on the entire solvent and it can be used optionally by 70% by weight or more, further, 80% by weight or more and, particularly, 90% by weight or more.

Further, as an auxiliary solvent, solvents selected from alcohols, polyhydric alcohols, glycol ethers with a vapor pressure at 25° C. of 0.001 mmHg or higher are suitable.

Specific examples usable as the auxiliary solvent are identical with those described for the first aspect.

Further, in addition to the solvents described above, polyhydric alcohol derivatives, sorbitane fatty acid type, polyglycerin higher fatty acid type, sucrose fatty acid type, and propylene glycol fatty acid type derivatives mentioned as examples of the other solvent that can be added within a range not hindering the solubility with the mixture of the phosphate ester and the amine type compound and the volatiling performance have also been described in view of the first aspect.

The oil-based ink composition for a ball-point pen in view of the aspect of the present invention has a feature of using a pigment as a colorant. This is more excellent in view of the safety and the fastness compared with conventional metal-containing dyes used in oil-based ball-point pens. The pigment may be used alone or may be used in the combined form of a pigment and a dye, particularly, in view of the coloring property.

The pigment to be used and the dye to be used in combination with the pigment can be identical to those described in view of the first aspect.

As the pigments, those less soluble in the organic solvent of the chemical structural formula (1) to be used and having an average grain size after dispersion of from 30 nm to 700 nm are preferred. For the blending amount of the pigment, it can be blended, optionally, within a range from 0.5 to 25% by weight, preferably, from 0.5 to 20% based on the entire amount of the ink composition.

Further, while the fastness becomes excellent by the use of the pigment, it is preferred to use the dye in combination for enhancing the coloring property. However, the dye to be used in combination with the pigment in the oil-based ink composition as the second aspect of the present invention is preferably a dye which is stable when a 50% solution in the solvent represented by the chemical structural formula (1) is left at 0° C. for three days and can have a viscosity of 2,000 mPa·s or lower.

By the way, it has been found that, for preparing a pigment dispersion with the solvent comprising the solvent of the structural chemical formula (1) as a main solvent in view of the second aspect of the present invention, polyvinyl butyral having a low hygroscopicity is excellent in the stability and suitable for the pigment dispersant since the solvent of the chemical structural formula (1) is highly hygroscopic. This is because the use of a highly hygroscopic polyvinyl pyrrolidone, polyvinyl alcohol or polyvinyl ether may cause a disadvantage of increasing the hygroscopicity of the entire ink or cause violent deposition of the ink to the paper surface due to the lowering of the viscosity. Other pigment dispersants, for example, styrene-maleic acid copolymer, ketone resin, hydroxyethyl cellulose or derivatives thereof, styrene-acrylic acid copolymer, etc. are not suitable since they tend to become unstable in the solvent to be used in view of the stability of the pigment dispersion and cause disadvantage such as occurrence of cohesion or precipitation of the pigment. That is, in the oil-based ball-point pen ink in this aspect, only the polyvinyl butyral is used essentially as the pigment dispersant, As other resins do not cause interaction with the butyral resin, they may be used optionally.

Further, in a case of using a solvent comprising the solvent of the chemical structural formula (1) as the main solvent and providing a back-flow-preventive mechanism to the joint in the oil-based ball paint pen of the present invention, if the viscosity at 25° C. is 6,000 mPa·s or more as in conventional oil-based ball-point pens, the back-flow-preventive ball in the joint is extremely difficult to move, causing disadvantages during writing and it has been found that the pigment dispersion is necessarily giving a low viscosity. In order that the back-flow-preventive ball in the joint moves easily and can be used suitably, it has been found that the viscosity at 25° C. may be 3,000 mPa·s or lower and the preferred viscosity (25° C.) is from 500 to 3,000 mPa·s. In a case where it is lower than 500 mPa·s, the ink tends to blobbing to the paper surface and a sufficient performance cannot be provided.

As described above, in order not to increase the viscosity but to enhance the dispersibility of the pigment, it has been found that the average molecular weight of the polyvinyl butyral is preferably relatively low as from 10,000 to 30,000. While not restrictive, when a polyvinyl butyral of a type having a medium or higher polymerization degree (average molecular weight; 30,000 or more) is used as the dispersant, the dependence on the concentration increases in the organic pigment and a worry also remains in view of the stability. Further, the pigment dispersion using a dispersant of medium or higher polymerization degree tends to increase the viscosity excessively and it exceeds the range of the viscosity described above upon formulation into the ink. Accordingly, polyvinyl butyral with the average molecular weight up to 10,000 to 30,000 is suitable.

The polyvinyl butyral used in view of this aspect of the present invention includes, for example, S-LEC B series manufactured by Sekisui Chemical Co. and Denkabutyral series manufactured by Denka Co. and, specifically, BL-1, BL-2, BL-2H, BL-S, BL-SH, BX-10 and BX-L.

For the addition amount of the polyvinyl butyral, it is preferably dispersed by addition as the amount of the dispersant of from 20 to 60 mass % based on the amount of the pigment and, it is more preferably, from 25 to 50 mass %. The pigment is used at a concentration within a range of use in view of the performance. As the concentration of the pigment increases, it may possibly exceed the predetermined range of viscosity also in a case of formulation into the ink. On the contrary, in a case where the concentration of the pigment is excessively low, it results in a problem for the fastness and results in trouble to light fastness or the like.

In the oil-based ink composition in view of the second aspect of the present invention, while polyvinyl butyral is used for the pigment dispersant and the fixing agent, other dispersants may also be used in combination within a range not deteriorating the purpose of the present invention.

As it is preferred that the back-flow-preventive ball used for the back-flow-preventive mechanism preferably has a higher specific gravity so as to be moveable easily, a metal ball, particularly, a ball made of SUS is preferred and, further, a ball made of a super hard or carbide metal material of further higher specific gravity is more preferred.

In the oil-based ball-point pen using the oil-based ink composition in view of the second aspect of the present invention, a back-flow-preventive mechanism is preferably provided to a joint portion connecting a tip and an ink containing tube. As has been described above, in a case of using the solvent of the chemical structural formula (1) with an aim of obtaining smooth writing feel, since the disadvantage due to intrusion of air has been found, the back-flow-preventive mechanism is provided for preventing the air intrusion.

Figure 1:
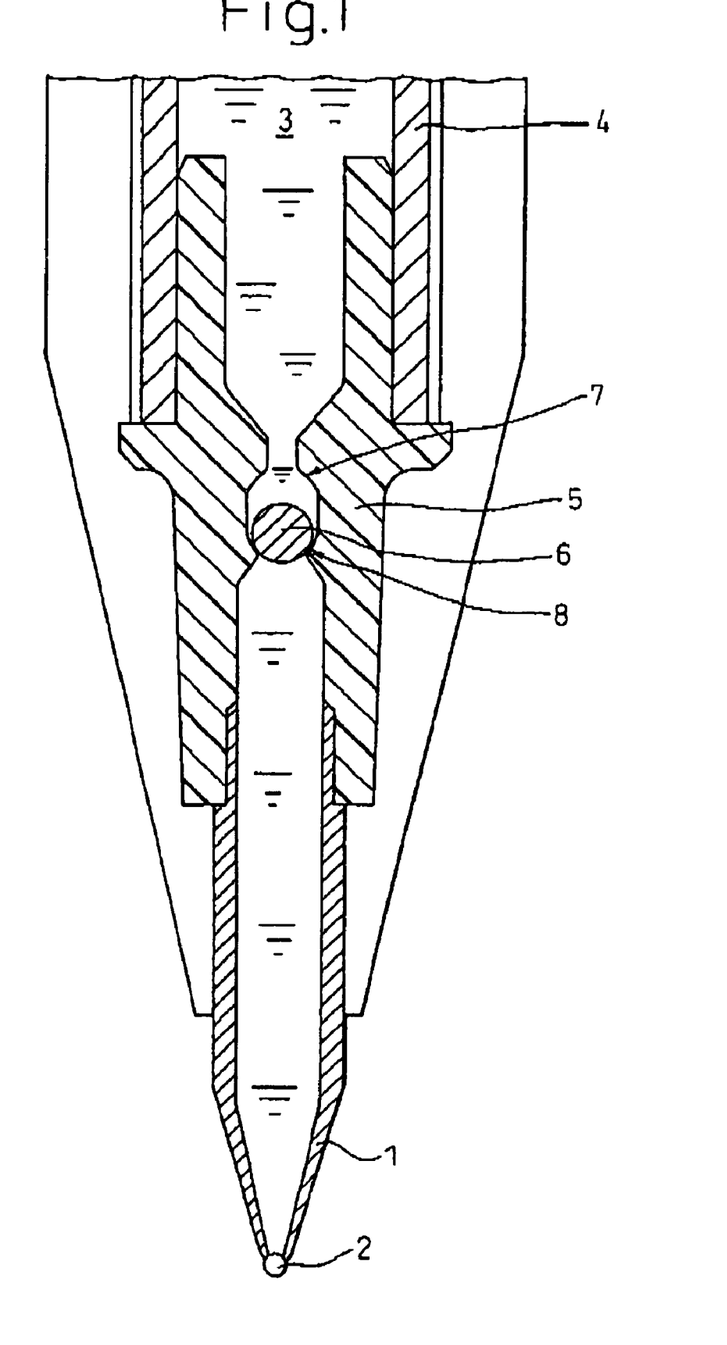
FIG. 1 is a schematic cross sectional view showing an example of a ball-point pen that mounts a back-flow-preventive mechanism therein.

The back-flow-preventive mechanism mounted on the oil-based ball-point pen in view of the second aspect (effective also for the first aspect) of the present invention can be a back-flow-preventive mechanism known in conventional aqueous ball-point pens and gel ink ball-point pens. FIG. 1 shows an example of a typical back-flow-preventive mechanism, in which a back-flow-preventive mechanism comprising a back-flow-preventive ball 6 and ball seats 7, 8 formed in a joint portion 5 connecting a tip 1 containing a back-flow-preventive ball 2 made of a metal or a super hard (cemented carbide) material at the top end and an ink-containing tube 4 containing an ink composition 3.

The oil-based ink composition in view of the second aspect of the present invention is used for the oil-based ball-point pen that mounts the back-flow-preventive mechanism and constituted such that it can prevent intrusion of air from the pen tip.

In a case of using the oil-based ink composition of the present invention to a ball-point pen, it is further preferred to provide an ink follower at the rear end of the ball-point pen. As the solvent of the chemical structural formula (1) to be used is volatile, the ink follower is added for preventing evaporation, preventing moisture absorption and preventing ink wetting. The ink follower may be those described for the first aspect.

Also the resin used in the oil-based ink composition for a ball-point pen in view of this aspect of the present invention can be those described for the first aspect.

Further, in the invention, anti-rust agents, anti-mold agents, surfactants, lubricants, wetting agents, etc. that are compatible with the ink with no undesired effect thereon can optionally be blended in the same manner as in the first aspect.

EXAMPLES

The invention is further described specifically by way of examples but the invention is not restricted by the examples.

<Examples for First Aspect—Condition (a))>

For the neutralization product of the phosphate ester used for the preparation of the ink, a phosphate ester and an amine type compound each prepared as 2% solution of the main solvent were used and neutralizing titration was conducted to obtain a point of neutralization of the two compounds. By mixing the two compounds at a predetermined value based on the neutralization ratio, a neutralization product of the phosphate ester was obtained.

The ingredients used in the following examples and the comparative examples are those described below.

YP90L: terpenephenol resin

Spiron Violet C-RH: spirit soluble dye based on methyl violet

Spiron Yellow C-GNH: spirit soluble yellow dye

Printex #35: carbon black manufactured by Degussa Co.

Hilac 110H: alcohol soluble resin

Spiron Blue C-RH: spirit soluble blue dye

Chromophthal Blue-A-3R: indathrene pigment

Chromophthal Violet B: dioxadine violet (pigment)

Polyvinylpyrrolidone K-90: polyvinyl pyrrolidone resin

Examples 1 to 4 and Comparative Examples 1 to 4 are as shown below. The blending amounts below are on the weight basis.

Example 1

| | |
|---|---:|
| Carbon black #25 [manufactured by Mitsubishi Kasei] | 10% |
| Polyvinyl butyral BL-S: (polymerization degree: 350, theoretical molecular weight: 23,000) [manufactured by Sekisui Chemical] | 5% |
| YP90L [manufactured by Yasuhara Chemical] | 8% |
| Polyvinyl butyral BH-3 (polymerization degree: 1700, theoretical molecular weight: 110,000) [manufactured by Sekisui Chemical] | 0.5% |
| Phosphate ester: Brisurf A208B | 1.47% |
| Amine type compound: polyoxyethylene alkylamine (AMIET105) | 1.03% |
| 3-methoxybutanol | 5% |
| 3-methoxy, 3-methyl, 1-butanol | 69.0% |

Example 2

| | |
|---|---:|
| Spiron Violet C-RH [manufactured by Hodogaya Chemical Industry] | 8% |
| Spiron Yellow-C-GNH [manufactured by Hodogaya Chemical Industry] | 5% |
| Printex #35 [manufactured by Degussa Co.] | 8% |
| Polyvinyl butyral BL-1 (polymerization degree: 300, theoretical molecular weight: 19,000) [manufactured by Sekisui Chemical] | 4% |
| Polyvinyl butyral BH-3 (polymerization degree: 1700, theoretical molecular weight: 110,000) [manufactured by Sekisui Chemical] | 0.6% |
| Hilac 110H [manufactured by Hitachi Chemical] | 12% |
| Phosphate ester: Phosphanol LB-400 | 1.46% |
| Amine type compound: Polyoxyethylene oleylamine (TAMNO-5) | 1.04% |
| 3-methoxybutanol | 4.4% |
| 3-methoxy, 3-methyl, 1-butanol | 55.5% |

Example 3

| | |
|---|---:|
| Spiron Blue C-RH [manufactured by Hodogaya Chemical Industry] | 8% |
| Spiron Violet C-RH [manufactured by Hodogaya Chemical Industry] | 4% |
| Chromophthal Blue-A-3R [manufactured by Ciba Geigy Co.] | 8% |
| Polyvinyl butyral BL-1 (polymerization degree: 300, theoretical molecular amount: 19,000) [Sekisui Chemical] | 4% |
| Polyvinyl butyral BH-S (polymerization degree: 1000, theoretical molecular weight: 66,000) [manufactured by Sekisui Chemical] | 0.5% |
| Polyvinyl butyral BH-3 (polymerization degree: 1700, theoretical molecular weight: 110,000) [manufactured by Sekisui Chemical] | 0.6% |
| Hilac 110H [manufactured by Hitachi Chemical] | 8% |
| Phosphate ester: PRISERF A208B | 1.47% |
| Amine-type compound: polyoxyethylene alkylamine (AMIET105) | 1.03% |
| 3-methoxy, 3-methyl, 1-butanol | 64.4% |

Example 4

| | |
|---|---|
| Spiron Violet C-RH [manufactured by Hodogaya Chemical Industry] | 10% |
| Chromophthal Blue B [manufactured by Ciba Geigy Co.] | 5% |
| Polyvinyl butyral BL-S (polymerization degree: 350, theoretical molecular amount: 23,000) [manufactured by Sekisui Chemical] | 3% |
| Polyvinyl butyral BH-3 (polymerization degree: 1700, theoretical molecular amount: 110,000) [manufactured by Sekisui Chemical] | 0.7% |
| Hilac 110H [manufactured by Hitachi Chemical] | 12% |
| Phosphate ester: Phosphanol LB-400 | 1.46% |
| Amine type compound: Polyoxyethylene oleylamine (TAMNO-5) | 1.04% |
| 3-methoxy, 3-methyl, 1-butanol) | 66.8% |

Comparative Example 1

| | |
|---|---|
| Carbon black #25 [Mitsubishi Chemical] | 10% |
| Polyvinyl butyral BL-S (polymerization degree: 350, theoretical molecular weight: 23,000) [manufactured by Sekisui Chemical] | 5% |
| YP90L [manufactured by Yasuhara Chemical] | 8% |
| Phosphate ester: PRISERF A208B | 1.47% |
| Amine-type compound: polyoxyethylene alkylamine (AMIET105) | 1.03% |
| 3-methoxybutanol | 5% |
| 3-methoxy, 3-methyl, 1-butanol | 69.5% |

Comparative Example 2

| | |
|---|---|
| Spiron Violet C-RH [manufactured by Hodogaya Chemical Industry] | 8% |
| Spiron Yellow-C-GNH [manufactured by Hodogaya Chemical Industry] | 5% |
| Printex #35 [manufactured by Degussa Co.] | 8% |
| Polyvinyl butyral BL-1 (polymerization degree: 300, theoretical molecular weight: 19,000) [manufactured by Sekisui Chemical] | 4% |
| Polyvinyl butyral BL-S (polymerization degree: 350, theoretical molecular weight: 23,000) [manufactured by Sekisui Chemical] | 0.6% |
| Hilac 110H [manufactured by Hitachi Chemical] | 12% |
| Phosphate ester: Phosphanol LB-400 | 1.46% |
| Amine type compound: Polyoxyethylene oleylamine (TAMNO-5) | 1.04% |
| 3-methoxybutanol | 4.4% |
| 3-methoxy, 3-methyl, 1-butanol | 55.5% |

Comparative Example 3

| | |
|---|---|
| Spiron Blue-C-RH [manufactured by Hodogaya Chemical Industry] | 8% |
| Spiron Violet-C-RH [manufactured by Hodogaya Chemical Industry] | 4% |
| Chromophthal Blue-A-3R [manufactured by Ciba Geigy Co.] | 8% |
| Polyvinyl butyral BL-1 (polymerization degree: 300, theoretical molecular amount: 19,000) [manufactured by Sekisui Chemical] | 4% |
| Polyvinyl pyrrolidone K-90 [manufactured by ISP Co.] | 0.5% |
| Hilac 110H [manufactured by Hitachi Chemical] | 8% |
| Phosphate ester: PRISERF A208B | 1.47% |
| Amine-type compound: polyoxyethylene alkylamine (AMIET105) | 1.03% |
| 3-methoxy, 3-methyl, 1-butanol | 65.0% |

Comparative Example 4

| | |
|---|---|
| Spiron Violet C-RH [manufactured by Hodogaya Chemical Industry] | 10% |
| Chromophthal Blue B [manufactured by Ciba Geigy Co.] | 5% |
| Polyvinyl butyral BL-S (polymerization degree: 350, theoretical molecular amount: 23,000) [manufactured by Sekisui Chemical] | 3% |
| Polyvinyl butyral BM-S (polymerization degree: 800, theoretical molecular amount: 53,000) [manufactured by Sekisui Chemical] | 0.7% |
| Hilac 110H [manufactured by Hitachi Chemical] | 12% |
| Phosphate ester: Phosphanol LB-400 | 1.46% |
| Amine type compound: Polyoxyethylene oleylamine (TAMNO-5) | 1.04% |
| 3-methoxy, 3-methyl, 1-butanol | 66.8% |

Inks obtained in the Examples and Comparative Examples as described above were filled and the following evaluation tests were conducted.

1) Evaluation for blobbing phenomenon (functional evaluation):

A pen was tilted at 60° at 25° C. and 65% RH and linear writing was conducted along a scale continuously for three times and the extent of the ink deposited on the pen tip was observed.

Fine with less ink stagnation: AA

Some contamination with ink stagnation: BB

Remarkable contamination with much ink stagnation: CC

The ball-point pen used for the test had a polypropylene tube of 1.60 mm inner diameter and a stainless steel tip (ball made of a super-hard or carbide metal alloy of 1.0 mm diameter). Further, after filling, the following evaluation was conducted after 30 min under the condition at 25° C. and 65% RH.

2) Evaluation for aged blobbing phenomenon under high humidity (sensory evaluation):

A pen body was left horizontally in a high temperature bath at 50° C. and 80% RH fox two weeks and, after taking out the same and leaving for 1 day under the condition at 25° C. and 65% RH, the pen was set at 60°, applied with a load of 200 g and the paper in contact therewith was moved at a speed of 4.5 m/min and the manuscript drawn line was observed.

Fine with less ink stain to the manuscript drawn line: aa

Relatively fine with some ink stain to the manuscript line: bb

Not fine with much ink stain to the manuscript line: cc

Dirty with much ink stain on the manuscript line: dd

The ball-point pen used for the test had a polypropylene tube of 1.60 mm inner diameter and a stainless steel tip (ball made of a super-hard alloy of 1.0 mm diameter). Further, after filling, the following evaluation was conducted after 30 min under the condition at 25° C. and 65% RH.

TABLE 1

Evaluation result

|  | Examples | | | | Comparative Examples | | | |
| --- | --- | --- | --- | --- | --- | --- | --- | --- |
|  | 1 | 2 | 3 | 4 | 1 | 2 | 3 | 4 |
| 1)Evaluation | AA | AA | AA | AA | CC | CC | CC | CC |
| 2)Evaluation | aa | aa | aa | aa | cc | cc | dd | cc |

As apparent from the result described above, it was found that the ink compositions of Examples 1 to 4 within the scope of the invention were excellent in suppressing point seepage (deposition blobbing) of the ink to the pen tip due to manuscript and accompanying drip (drawn line blobbing) of the ink to the paper surface as much as possible, compared with the ink compositions of Comparative Examples 1 to 4 that were out of the scope of the invention.

<Example for the First Aspect—Condition (b)->

Ingredients used for the following examples and comparative examples are as described below.

Polyvinyl butyral BL-1: polyvinyl butyral of theoretical molecular weight of 19,000

Polyvinyl butyral BL-S: polyvinyl butyral of theoretical molecular weight of 23,000

Polyvinyl butyral BM-1: polyvinyl butyral of theoretical molecular weight of 40,000

YP 90L: Terpene phenol resin

Spiron violet C-RE: spirit soluble dye based on methyl violet

Spiron yellow-C-GNH: spirit soluble yellow dye

Printex #35: carbon black (pigment)

Hilac 110H: alcohol soluble resin

Chromophthal blue A-3R: Indanthrene (pigment)

Chromophthal violet B: dioxazine violet (pigment)

Polyvinyl pyrrolidone K-39: polyvinyl pyrrolidone resin

Diana process oil PW-90: liquid paraffin (mineral oil)

Aerosil R-972: fine silica particle

P-105: terpene resin

The viscosity to be described below was measured by E-type viscometer, at EMD 10 rpm value, using a regular cone.

Examples 11 to 15 and Comparative Examples 11 to 14 are as described below.

Example 11

Viscosity at 25° C.: 500 mP·s

| | |
| --- | --- |
| Carbon black #25 [manufactured by Mitsubishi Chemical] | 10% |
| Polyvinyl butyral BL-S [manufactured by Sekisui Chemical] | 5% |
| YP90L [manufactured by Yasuhara Chemical] | 10% |
| 3-methoxybutanol | 5% |
| 3-methoxy, 3-methyl, 1-butanol | 70% |

Example 12

Viscosity at 25° C.: 1100 mP·s

| | |
| --- | --- |
| Spiron Violet C-RH [manufactured by Hodogaya Chemical Industry] | 8% |
| Spiron Yellow-C-GNH [manufactured by Hodogaya Chemicals Insuarey] | 5% |
| Printex #35 [manufactured by Degussa Co.] | 8% |
| Polyvinyl butyral BL-1 [manufactured by Sekisui Chemical] | 4% |
| Hilac 110H [manufactured by Hitachi Chemical] | 12% |
| 3-methoxybutanol | 10% |
| 3-methoxy, 3-methyl, 1-butanol | 53% |

Example 13

Viscosity at 25° C.: 1300 mP·s

| | |
| --- | --- |
| Spiron blue-C-RH [manufactured by Hodogaya Chemical Industry] | 8% |
| Spiron violet-C-RH [manufactured by Hodogaya Chemical Industry] | 4% |
| Chromophthal Blue-A-3R [manufactured by Ciba Geigy Co.] | 8% |
| Polyvinyl butyral BL-1 [manufactured by Sekisui Chemical] | 4% |
| Hilac 110H [manufactured by Hitachi Chemical] | 8% |
| 3-methoxy, 3-methyl, 1-butanol | 68% |

Example 14

Viscosity at 25° C.: 1300 mP·s

| | |
| --- | --- |
| Spiron violet C-RH [manufactured by Hodogaya Chemical Industry] | 10% |
| Chromophthal Blue B [manufactured by Ciba Geigy Co.] | 5% |
| Polyvinyl butyral BL-S [manufactured by Sekisui Chemical] | 3% |
| Hilac 110H [manufactured by HULUSE] | 12% |
| 3-methoxy, 3-methyl, 1-butanol | 70% |

Example 15

Viscosity at 25° C.: 900 mP·s

| | |
| --- | --- |
| Spiron red C-GH [manufactured by Hodogaya Chemical Industry] | 10% |
| DPP Red BP [manufactured by Ciba Geigy Co.] | 5% |
| Polyvinyl butyral BL-1 [manufactured by Sekisui Chemical] | 3% |
| Hilac 110H [manufactured by Hitachi Chemical] | 12% |
| 3-methoxy, 3-methyl, 1-butanol | 70% |

Comparative Example 11

With No Pigment

| | |
|---|---|
| Spiron violet C-RH | 10% |
| [manufactured by Hodogaya Chemical Industry] | |
| Polyvinyl butyral BL-S | 5% |
| [manufactured by Sekisui Chemical] | |
| YP90L [manufactured by Yasuhara Chemical] | 10% |
| 3-methoxybutanol | 5% |
| 3-methoxy, 3-methyl, 1-butanol | 70% |

Comparative Example 12

As Dispersant is PVP having a High Hygroscopicity, Blobbing Increases

| | |
|---|---|
| Spiron violet C-RH | 10% |
| [manufactured by Hodogaya Chemical Industry] | |
| Chromophthal Violet B [manufactured by Ciba Geigy Co.] | 5% |
| Polyvinyl pyrrolidone K-30 [manufactured by ISP Co.] | 3% |
| Hilac 110H [manufactured by Hitachi Chemical] | 12% |
| 3-methoxy, 3-methyl, 1-butanol | 70% |

Comparative Example 13

Dispersant is not Dispersible Resin Other than PVB

| | |
|---|---|
| Spiron violet C-RH | 10% |
| [manufactured by Hodogaya Chemical Industry] | |
| Chromophthal Violet B [manufactured by Ciba Geigy Co.] | 5% |
| Hilac 110H [manufactured by Hitachi Chemical] | 3% |
| Hilac 110H [manufactured by Hitachi Chemical Co.] | 12% |
| 3-methoxy, 3-methyl, 1-butanol | 70% |

Comparative Example 14

Not of Chemical Structural Formula (1)

| | |
|---|---|
| Printex #35 [manufactured by Degussa Co.] | 15% |
| Polyvinyl butyral BL-1 | 8% |
| [manufactured by Sekisui Chemical] | |
| Hilac 110H [manufactured by Hitachi Chemical] | 12% |
| Polypropylene glycol (molecular weight: 400) | 40% |
| Polypropylene glycol (molecular weight: 1000) | 25% |

The inks obtained in Examples and Comparative Examples described above were filled and the following evaluation tests were conducted.

The ball-point pen used for the tests had a polypropylene tube of 1.60 mm inner diameter and a stainless steel tip (ball made of a super-hard alloy of 1.0 mm diameter). Further, after filling, the following evaluation was conducted after 30 min under the condition at 25° C. and 65% RH. The ink follower for preventing ink evaporation and preventing moisture absorption had the following formulation.

| | |
|---|---|
| Diana process oil PW-90 | 67% |
| Aerosil R-972 | 3% |
| P-105 (terpene resin) | 30% |

As a back-flow-preventive mechanism joint, a joint for a Signo UM-100 manufactured by Mitsubishi Pencil Co., was utilized and, further, joined with the tube using a metal tube.

1) Evaluation for Light Fastness (Mechanical Evaluation):

The pen was set at an angle of 60° at 25° C. and 65% RH and applied with a load of 200 g, and the paper in contact therewith was moved spirally at a speed of 4.5 m/min, the manuscript line was cut out to a predetermined size and judgment was made according to the following standards based on the degree of discoloration at 100 h by a fade meter.

Those in which spirals could be read: AA

Those in which they could be read although rather pale: BB

Those in which they could scarcely be read: CC

2) Evaluation for Dispersion Stability;

The pigments and the dispersants were dispersed, with a formulation in which dyes and resins of Examples and Comparative Examples were not added, by a paint shaker using ϕ0.5 zirconia beads as a media for one hour. Subsequently, each of Examples and Comparative Examples was prepared according to the predetermined formulations. Then, after dispersion is made, the state in which the media to as removed and the ink was left at a normal temperature for 30 min was visually observed. Judgment was conducted from those showing a viscosity increase and gelation.

Those having flowability with no problem in dispersion: AA

Those somewhat poor in the flowability: BB

Those gelled and with no flowability: CC

3) Evaluation for the Ball Moveability in the Back-Flow-Preventive Mechanism:

The pen was left pointed upwarded for three days under the condition at 25° C. and 65% RH. Then, writing of circles was conducted continuously on predetermined writing paper and a disadvantage in view of the manuscript was observed.

Those capable of continuous writing of circles with no problem at all: AA

Those not capable of transferring the ink for 1 to 2 turns to about the third to fifth turn: BB Those not capable of transferring the ink for 3 or more turns to about the third to fifth turns: CC

TABLE 2

| | Evaluation result | | | | | | | | |
|---|---|---|---|---|---|---|---|---|---|
| | Examples Glycerin added | | | | | Comparative Examples | | | |
| | 11 | 12 | 13 | 14 | 15 | 11 | 12 | 13 | 14 |
| Light fastness evaluation | AA | AA | AA | AA | AA | CC | AA | — | AA |

TABLE 2-continued

| | Evaluation result | | | | | | | | |
|---|---|---|---|---|---|---|---|---|---|
| | Examples Glycerin added | | | | | Comparative Examples | | | |
| | 11 | 12 | 13 | 14 | 15 | 11 | 12 | 13 | 14 |
| Dispersibility evaluation | AA | AA | AA | AA | AA | — | BB | CC | BB |
| Ball moveability | AA | AA | AA | AA | AA | AA | AA | — | CC |

Note)
Comparative Example 11: Dispersibility could not be evaluated since the pigment was not present

Comparative Example 13

It Could Not be Formulated into the Ink as the Pigment Dispersion was Impossible

Comparative Example 14

The Dispersion was Evaluated as BB as the Viscosity was Excessively High Upon Pigment Dispersion

As is apparent from the result described above, it was found that the ink compositions of Examples 11 to 15 within the scope of the invention were excellent for light fastness, favorable with respect to the dispersion stability and excellent in the ensurance of the back-flow-preventive mechanism by the improvement for the movement of the ball compared with the ink compositions of Comparative Examples 11 to 14 that are out of the scope of the invention.

INDUSTRIAL APPLICABILITY

The present invention provides an oil-based ink composition for use in a ball-point pen capable of suppressing the blobbing phenomenon by controlling the internal cohesion of the ink, different from the existing method, an oil based ink composition for use in ball-point pen having smooth writing feel, excellent in the improvement of the fastness, coloring property and dispersion stability of the pigment and having a back-flow-preventive mechanism therein, as well as an oil-based ball-point pen using the same.

The invention claimed is:

1. An oil-based ink for a ball-point pen comprising at least a colorant and a resin, as well as a solvent selected from alcohols, polyhydric alcohols and glycol ethers each having a vapor pressure at 25° C. of 0.001 mmHg or higher as a main solvent occupying 50% or more of the entire solvent, and satisfying at least one of the following (a) and (b):
   (a) comprising from 0.01 to 1.5% by weight of a high polymerization degree polyvinyl butyral with a polymerization degree of 900 (theoretical molecular weight of 60,000) or more, and
   (b) comprising a pigment as the colorant and polyvinyl butyral as a dispersant, said main solvent being polyhydric alcohol or glycol ether represented by the following chemical structural formula (1)

(1)

where $R^1$, $R^2$, and $R^3$ each represents independently H or $CH_3$.

2. The oil-based ink composition for a ball-point pen according to claim 1, wherein in the case of (a) described above, the glycol ether is represented by the following chemical structural formula (1)

(1)

where $R^1$, and $R^3$ each represents independently H or $CH_3$, and $R^2$ represents $CH_3$.

3. The oil-based ink composition for a ball-point pen according to claim 1, wherein the colorant is a pigment or a pigment and a dye used in combination.

4. The oil-based ink composition for a ball-point pen according to claim 1, wherein in the case of (a) described above, polyvinyl butyral with a polymerization degree of 900 (theoretical molecular weight of 60,000) or less is further used as a pigment dispersant.

5. The oil-based ink composition for a ball-point pen according to claim 4, wherein polyvinyl butyral with a polymerization degree of 200 or more and 500 or less (theoretical molecular weight of from 10,000 to 30,000) is used as said pigment dispersant.

6. The oil-based ink composition for a ball-point pen according to claim 1, wherein a neutralization product of a phosphate ester is contained as an additive.

7. The oil-based ink composition for a ball-point pen according to claim 1, wherein in the case of (b) described above, the polyvinyl butyral has an average molecular weight of from 10,000 to 30,000.

8. The oil-based ink composition for a ball-point pen according to claim 1, which has an ink viscosity at 25° C. of from 500 to 3,000 mPa·s.

9. An oil-based ink composition for a ball-point pen comprising at least a colorant, a resin, and from 0.01 to 1.5% by weight of a high polymerization degree polyvinyl butyral with a polymerization degree of 900 (theoretical molecular weight of 60,000) or more, and further comprising a solvent, as a main solvent, selected from alcohols, polyhydric alcohols and glycol ether each having a vapor pressure at 25° C. of 0.001 mmHg or higher in an amount of 50% or more based on the entire solvent.

10. An oil-based ink composition for a ball-point pen comprising at least a pigment and a polyvinyl butyral as a dispers ant and, further, comprising a solvent, as a main solvent, represented by the following chemical structural formula (1)

(1)

where $R^1$, $R^2$, and $R^3$ each represents independently H or $CH_3$.

11. An oil-based ball point pen comprising an oil-based Ink composition for a ball-point pen as set forth in claim 1, and a back-flow-preventive mechanism provided to a joint portion for connecting a tip and an ink containing tube.

12. The oil-based ball point pen according to claim 11, wherein an ink follower is further provided at a rear end portion of the ink composition in the ink containing tube to prevent ink evaporation and back flow.

* * * * *